United States Patent [19]

Masaaki et al.

[11] Patent Number: 5,205,050
[45] Date of Patent: Apr. 27, 1993

[54] APPARATUS FOR DRYING POWDERED OR GRANULAR MATERIALS

[75] Inventors: Nosaka Masaaki; Ono Tsutomu; Tsutsumi Noriaki, all of Hirakata; Matsui Osamu, Osaka; Takino Yorinobu, Hirakata, all of Japan

[73] Assignee: Matsui Manufacturing Co., Ltd., Osaka, Japan

[21] Appl. No.: 814,398

[22] Filed: Dec. 26, 1991

[30] Foreign Application Priority Data

Oct. 4, 1991 [JP] Japan .................. 3-101272[U]

[51] Int. Cl.5 .................. F26B 3/34; H05B 6/64
[52] U.S. Cl. .................. 34/1 U; 219/10.55 A; 219/10.55 B; 34/48
[58] Field of Search .................. 34/1 T, 1 U, 1 V, 92, 34/15, 17, 18, 60, 209, 179; 219/10.55 A, 10.55 B, 10.55 D

[56] References Cited

U.S. PATENT DOCUMENTS

| | | | |
|---|---|---|---|
| 4,330,946 | 5/1982 | Courneya | 34/1 T |
| 4,567,340 | 1/1986 | Latchum, Jr. | 219/10.55 B |
| 4,640,020 | 2/1987 | Wear et al. | 34/1 T |
| 5,020,237 | 6/1991 | Gross et al. | 34/1 P |

Primary Examiner—Henry A. Bennet
Attorney, Agent, or Firm—Koda and Androlia

[57] ABSTRACT

The invention is directed to an apparatus for drying powdered or granular materials comprises a drying tank (1) including a transversely extending drying room (7) adapted to be applied with heating by microwaves, at least one partition (20) defining more than two drying zones in the drying room (7) of the drying tank (1), a rotary shaft (12) disposed in the drying tank (1) in its longitudinal direction to extend through the drying room (7) in a manner of being freely rotatable and agitating blades (30a), (30b) . . . provided on the rotary shaft correspondingly to each drying zone, microwave application units (40) provided for each drying zone, and temperature sensors (50) for each drying zone and corresponding temperature adjusters (51) connected to the respective temperature sensors (50).

48 Claims, 16 Drawing Sheets

APPARATUS FOR DRYING POWDERED OR GRANULAR MATERIALS

BACKGROUND OF THE INVENTION

1. Field of the Invention

This invention relates to an apparatus for drying powdered or granular materials (called hereunder materials) such as plastic materials, processed food materials, chemical materials for medical use, etc. by causing them to be subjected to dielectric heating by means of microwave (the drying operation including crystallizing the materials in the case of the materials as non crystallized polyethylene terephthalate, etc.).

2. Prior Art

This kind of apparatus for drying the powdered or granular materials has been hitherto proposed as shown in Japanese Unexamined Patent Application No. 301310/1989. The conventional drying apparatus for the materials comprises a transversely extending drying tank having a material inlet and outlet at one end and the other end of the tank in its longitudinal direction, and a microwave application unit for applying microwaves to the material of plastic material fed into the drying tank, wherein the drying tank has therein a rotary shaft mounting a plurality of disk-like shaped partitions to define partition spaces between adjacent partitions, the partitions being provided with agitating blades for agitating the material placed in the partition spaces and sending the materials to one of the partition spaces adjacent to the material outlet, and an exhaust port for the material at the side of the material outlet being provided with a rotary feeder.

The conventional drying apparatus causes the material placed in each partition space to be orderly transmitted to the partition space adjacent to the material outlet by turning the agitating blades, so that there may cause no dispersion of residence time of the material in the drying room, thereby enabling the material as a whole to be dried uniformly and continuously. However, the conventional art does not include a feature for providing the inside of the drying room with various distribution of temperatures, so that the material is not dried at separate drying temperatures. In other words, in case that there are different distribution of heating temperatures at the specific locations in the drying room, such as at the inlet, the central part of the room or the outlet, temperature control by the conventional apparatus is unstable and poor in accuracy since the apparatus controls temperatures by regarding only a heating temperature detected at a specific detection point as that of the whole drying room.

Also, the partitions, the partition spaces and agitating blades of the conventional example are provided transversely at the lower part of the drying room, so that there is such a defect that any materials of lower specific gravity supplied from the material inlet are likely to shortly pass over the upper parts of the agitating components.

Furthermore, the material outlet of the conventional example is so constituted that the powered or granular materials to be dried fall out of the outlet by their weights and the materials cannot be agitated by the agitating blades. Hence, there are such problems that the material outlet part provides a dead space where the materials are not agitated and happen to be solidified by microwaves.

Additionally, provision of the rotary feeder at the exhaust port at the side of material outlet makes hard a stable keeping of level of the materials in the drying tank, leading to hardness of a constant quantity control.

The present invention has been designed to overcome all of the above problems.

SUMMARY OF THE INVENTION

One of the objects of the present invention is to provide an apparatus for drying powdered or granular materials wherein drying temperatures in each drying zone of the drying room heated by microwaves are detected separately by respective temperature sensors to control temperatures for each drying zone separately by means of respective temperature adjusters thereof on the basis of the detected values of drying temperatures, so that the temperature control can be performed stably at any stages, such as upon startup of operation (drying), in continuous operation (continuous drying) and at the end of operation (drying), thereby allowing the whole drying room to be accurately controlled in temperatures to a desired value, resulting in that the materials are dried with high accuracy at any stages as upon startup of drying operation, in continuous drying operation and at the end of drying operation.

Another object of the present invention is to provide an apparatus for drying the materials wherein drying operation can have intermission with the drying zones of the drying tank being kept in control at a proper temperature when a next process does temporarily not receive the materials dried in the drying tank.

A further object of the present invention is to provide an apparatus for drying the materials which apparatus includes at least one partition member made of any material which does not allow microwaves to pass therethrough and defining more than two drying zones in the drying room, so that the materials fed through the material inlet are applied with microwaves in the drying zones while being agitated by the agitating blades to inevitably go along a route at the lower side of the drying room and be transmitted to the side of material outlet without shortly passing over the upper surface of the agitating layer.

A still another object of the present invention is to provide an apparatus for drying the materials wherein the material outlet is arranged at a position above an axis of a rotary shaft at the other end of the drying tank and is adapted to be usually closed by an outlet valve through a cylinder, operable by fluid pressure and opened by the outlet valve responsive to a material request signal from the next process to cause the dried materials to overflow the outlet, whereby it does not cause that the materials at the material outlet part are not agitated by the agitating blades.

A further another object of the present invention is to provide an apparatus for drying the materials wherein a slider provided at the outside of the material outlet may be operated to change sectional area of the opening of the material outlet, so that a fill of the materials in the drying room is adjusted to freely control residence time of the materials in the drying room in the continuous drying operation.

A further object of the present invention is to provide an apparatus for drying the materials wherein a weighing apparatus, such as a rotary feeder, is connected to the drying tank at the side of the material inlet, so that responsive to the material request signal from the next process, the material to be dried is fed at a constant amount and simultaneously the outlet valve is opened by the cylinder, operable by fluid pressure to cause the dried materials of the same amount as that fed material to overflow and be discharged from the material outlet, thereby enabling the level of the materials in the drying tank to be kept stably and providing an easy quantitative control of the materials in the drying tank.

A still further object of the present invention is to provide an apparatus for drying the materials, wherein in a continuous drying operation, the rotation number of a weighing apparatus, such as a rotary feeder, at the material inlet of the drying tank may be changed, the slider for changing sectional area of the opening of the material outlet may be adjusted, or temperatures of the drying zones may be set freely, so that drying operation is carried out at a desired throughput, in a desired residence time of the materials in the drying room and at desired specific temperatures to provide a stable drying operation with higher accuracy.

Further objects, characteristics and advantages of the present invention will be clarified in the following explanation.

To achieve the above objects, an apparatus for drying the materials according to the present invention comprises: a drying tank including a transversely extending drying room made of a material which does not allow microwaves to pass therethrough and adapted to be applied with heating by microwaves, the drying room having a material inlet at one end and a material outlet at the other end; at least one partition made of a material that not allow microwaves to pass therethrough and defining more than two drying zones in the drying room of the drying tank; a rotary shaft disposed in the drying tank in its longitudinal direction to extend through the drying room in a manner of being freely rotatable and agitating blades provided on the rotary shaft correspondingly to each drying zone; microwave application units provided for each drying zone; and temperature sensors for each drying zone and corresponding temperature adjusters connected to the respective temperature sensors.

The material outlet of the drying tank is formed above an axis of the rotary shaft at the remote end of the drying tank and is preferably adapted to be usually closed by an outlet valve through a cylinder ,operable by fluid pressure and opened responsive to a material request signal from a next process to cause the dried materials to overflow the material outlet.

In the above case, a slider member for changing sectinal area of the opening of the material outlet of the drying tank may be provided at the outside of the material outlet to enable adjustment of levels of the dried materials to overflow and be discharged from the material outlet.

It is preferable to connect a weighing apparatus, such as a rotary feeder, to the drying tank at the side of material inlet so as to enable materials to be fed from the upper side of the weighting apparatus. The weighing apparatus is to be used together with the above overflow type of material outlet construction. Also, the weighing apparatus preferably employs those changeable in their rotation numbers.

A driving source for driving the rotary shaft is preferably capable of changing the rotation number of the rotary shaft, so that the rotation number of the rotary shaft driven by the driving source is changed to properly adjust the speed of agitation of the materials agitated by the agitating blades according to the characters of materials, thereby preventing breakage or the like of the materials.

The drying tank may be preferably provided with an inlet and an outlet for carrier gas, such as dehumidifying air or the like, to exhaust water or the like of the drying room to the outside of the system.

The drying tank may be provided with a sealed construction and the material inlet and outlet may be connected with a cushion hopper, a valve, a vacuum pump or the like so as to provide the system of the drying apparatus with a construction enabling operation in vacuum condition, thereby enabling water or the like of the drying room to be exhausted to the outside of the system.

Both of the material inlet and outlet of the drying tank may be coupled with valves and the drying tank connected with a suction air source, so that the inside of the drying tank can be brought into a reduced pressure condition by the suction air source, thereby enabling water or the like of the drying room to be exhausted to the outside of the system.

Both of the material inlet and outlet of the drying tank may be coupled with valves and the drying tank connected with a suction air source, so that the inside of the drying tank is brought into a reduced pressure condition by the suction air source, thereby enabling water or the like of the drying room to be exhausted to the outside of the system. And at utmost end of the piping to which the valve is being connected may be connected with a vacuum hopper to which the suction air source is coupled, so that the inside of the vacuum hopper is brought into a vacuum condition by the suction air source.

Such feature may be provided that a piping is connected to the material outlet of the drying tank and connected at its utmost end with a hopper into which hopper is introduced through a dehumidifying air introduction line a dehumidifying air obtained by heating atmospheric air from a blower by means of a heater, so that water of the materials placed in the hopper is dehumidified and discharged from the material outlet, and the dehumidifying air introduced in the hopper is transmitted to the carrier gas inlet through an exhaust piping to be discharged through the carrier gas outlet to the outside of the system.

The above system may alternatively use, in place of the exhaust piping, a branching piping which is connected at its one end to the dehumidifying air introduction line part between the heater and hopper and at the other end to the carrier gas inlet.

Also, the above system may employ, in place of that exhaust piping, another branching piping which is connected at its one end to a portion between the blower and the heater and at the other end to the carrier gas inlet.

The above system may further use, in place of that exhaust piping, such feature of a piping which has a compressor at its one end and is connected at the other end with the carrier gas inlet.

Further, the system of drying apparatus may comprise a drying tank having a carrier gas inlet and a carrier gas outlet, a circulation piping connected at one end to the carrier gas outlet and at the other end to a dehumidifying unit, another circulation piping connected at one end to the dehumidifying unit and at the other end to a heater, a hopper connected to the system through the heater and a dehumidifying air introduction line and an exhaust piping connected at one end to the hopper and at the other end to the carrier gas inlet.

DETAILED DESCRIPTION OF THE INVENTION

First Embodiment

Figure 1:
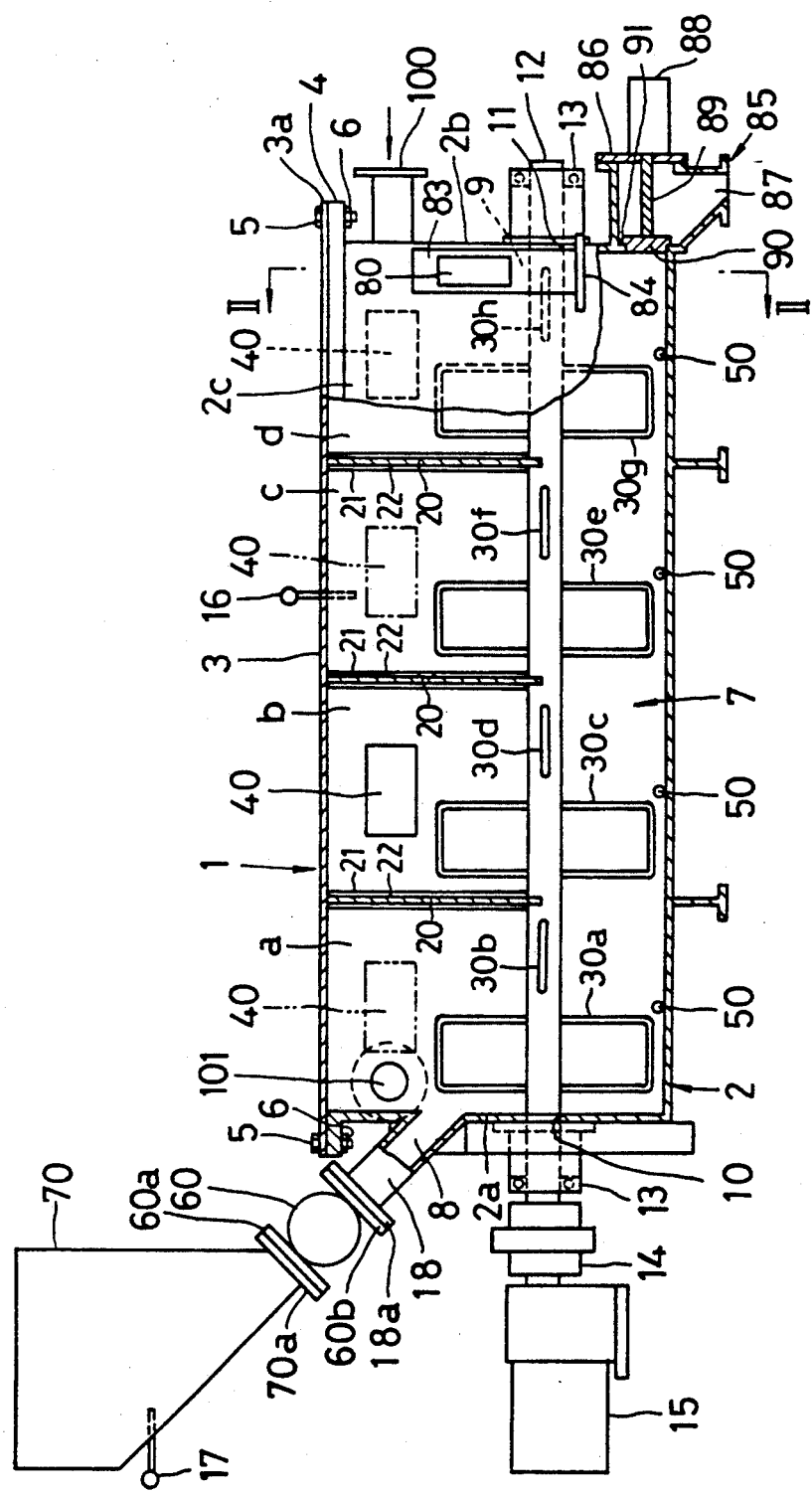
FIG. 1 is a particlally longitudinally sectional front view of a principal portion of the first embodiment.

A description of the 1st embodiment according to the present invention as shown in FIGS. 1 through 7 is given hereunder.

(1) is a drying tank comprising a metallic tank body (2) in a transversely extending rectangular parallelepiped shape having a U-like cross-section and a metallic lid member (3) for closing the upper opening of the tank body (2). The tank body (2) is tightly closed by the lid (3) in such manner that an annular flange (4) formed along the edge of the upper opening of the body (2) and an annular outer peripheral end portion (3a) of the lid member (3) are tightened by use of a tightening member, such as bolts (5) and nuts (6).

The inner space defined by the drying tank body (2) and the lid member (3) provides a drying room (7) which is subjected to dielectric heating by use of microwaves. The drying room (7) is provided at one end (a left side wall (2a) in FIG. 1) with a material inlet (8) and at the other end (a front side wall (2c) near a right side wall (2b) in FIG. 1) with a material outlet (9).

The left side wall (2a) and the right side wall (2b) provided in the longitudinal direction of the drying tank body (2) constituting the tank (1) have shaft bores (10), (11) at their lower parts. A rotary shaft (12) is rotatably supported in the shaft bores (10), (11) and journalled near both ends by bearings (13). The rotary shaft (12) is connected at its one end with a driving source (15), such as a geared motor or the like, through a coupling (14) as shown in FIG. 1, so that the driving source (15) is driven to rotate the rotary shaft (12).

The drying tank (1) has at least one partition (20) which is made of metal or the like that does not allow microwaves to pass therethrough and extends downwardly from the upper end of the tank (1) (the lid member (3)) near the rotary shaft (12) to define more than two drying zones (a), (b), (c), (d) in the drying room (7).

Figure 3:
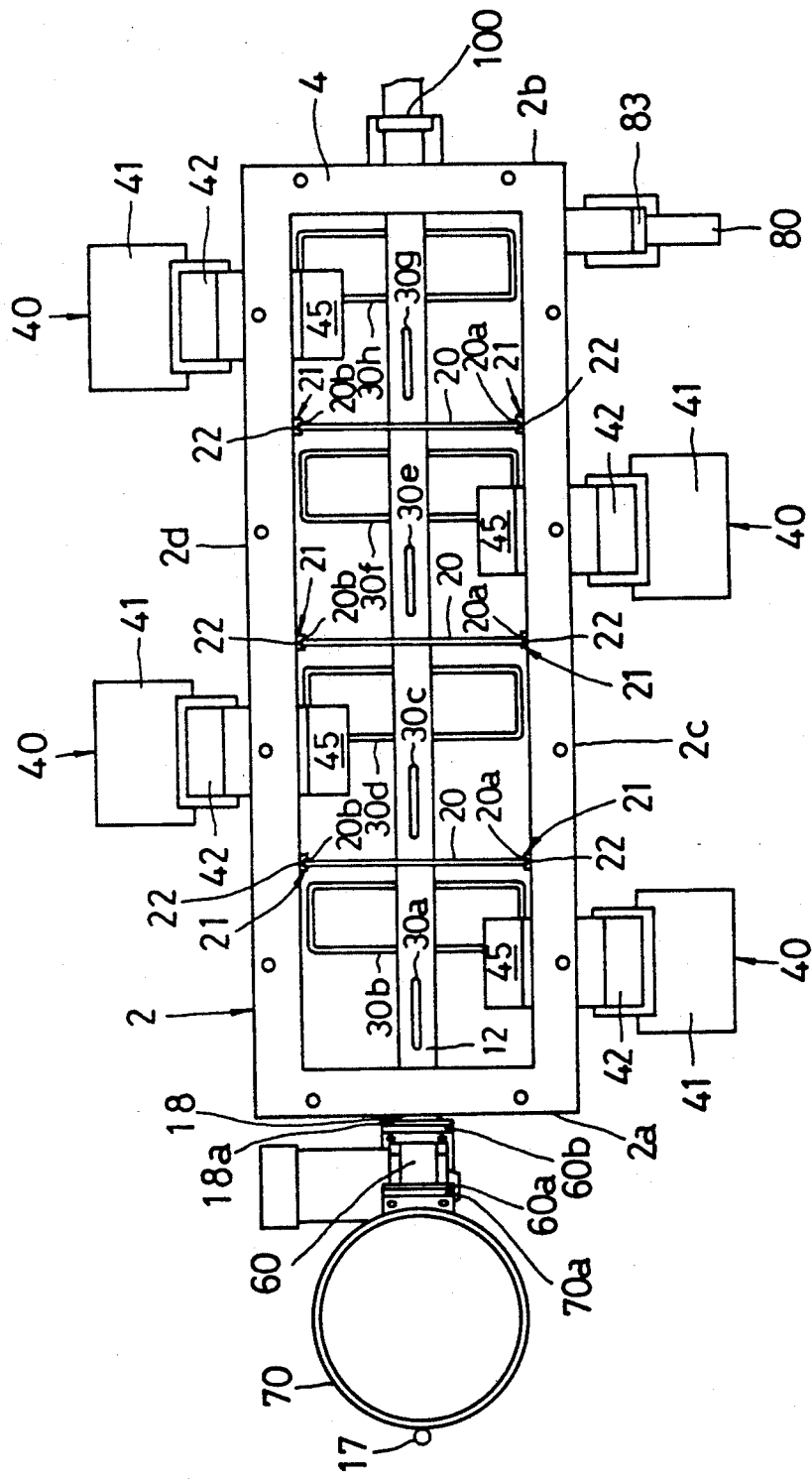
FIG. 3 is a plan view of the first embodiment shown in FIG. 1.
Figure 4:
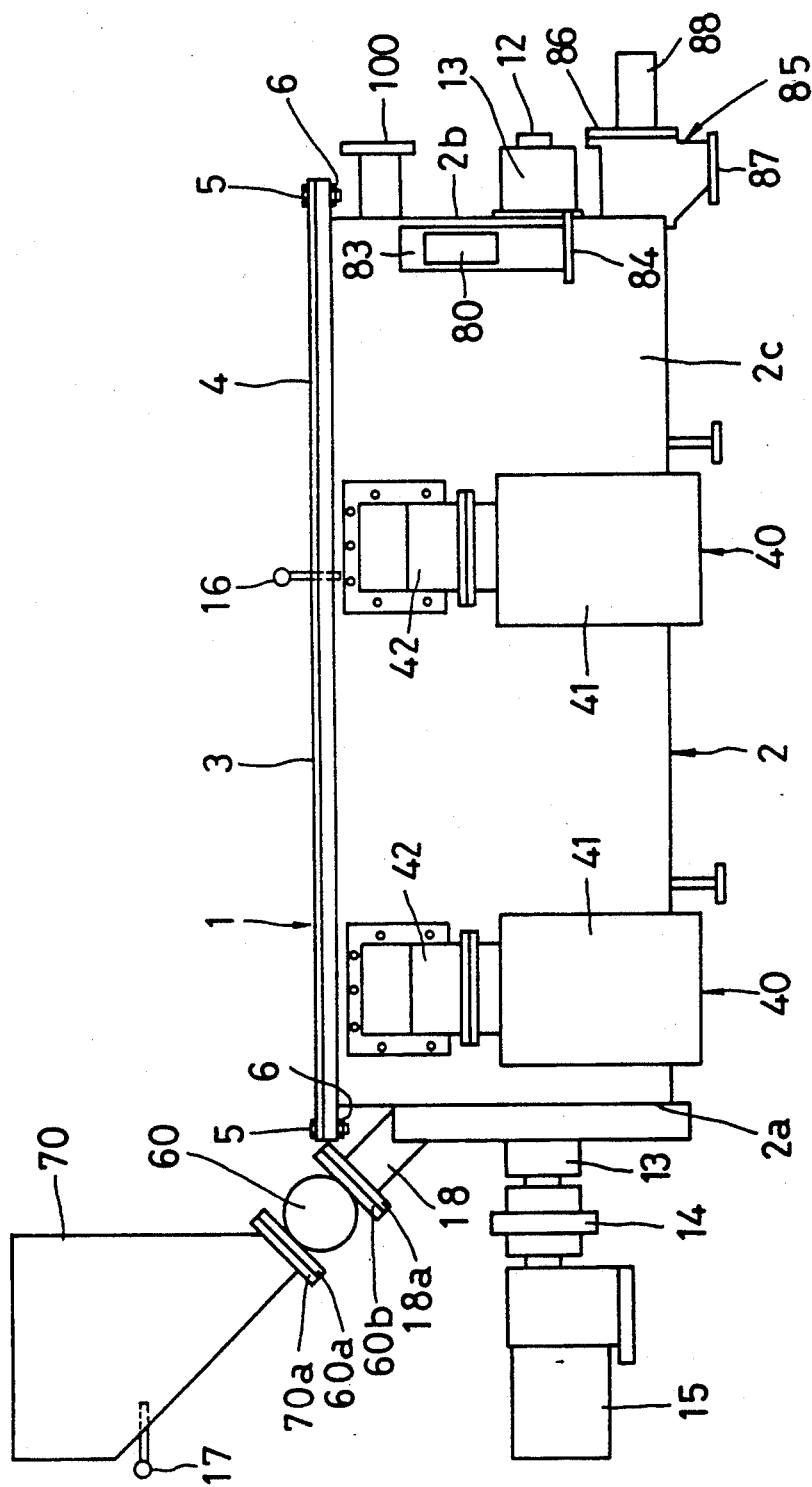
FIG. 4 is a front view of the same.
Figure 5:
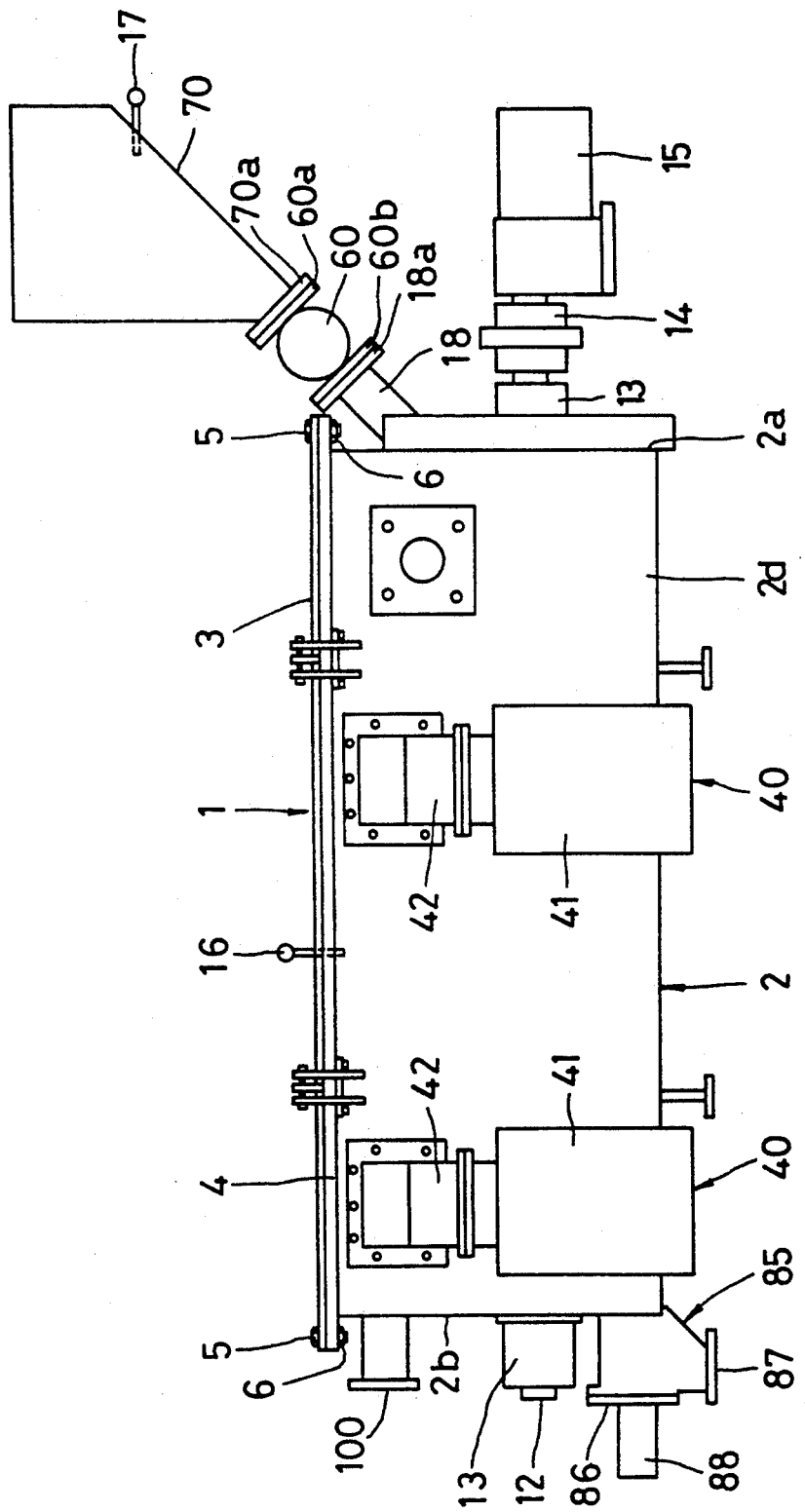
FIG. 5 is a rear view of the same.
Figure 6:
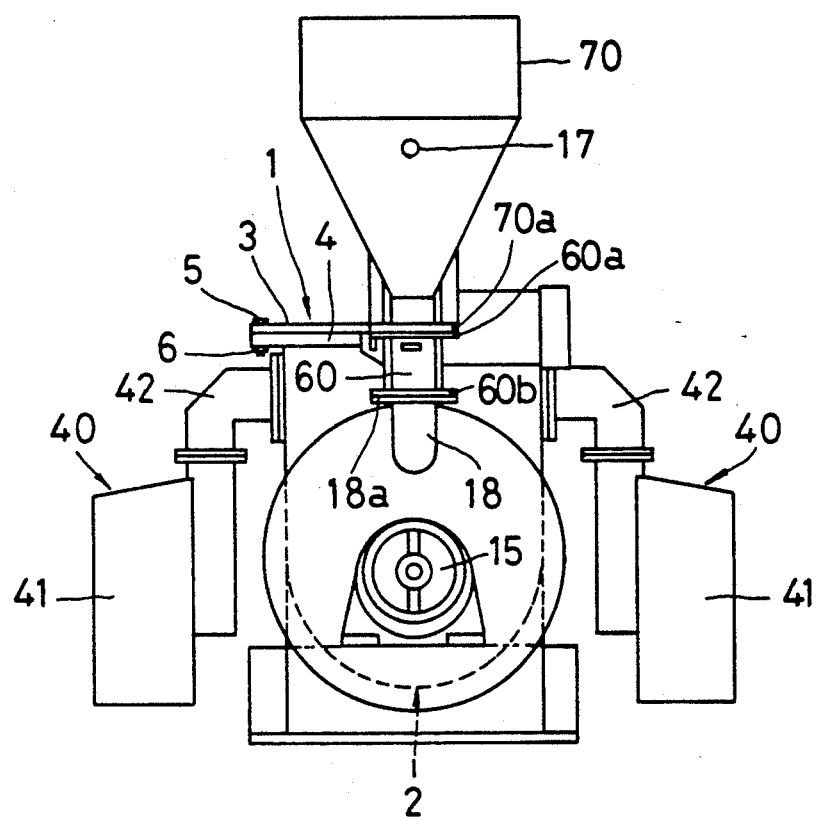
FIG. 6 is a leftside view of the same.

In detail, as seen in FIG. 3, longitudinally elongated protuberances (21) having almost U-like cross-section are arranged at a proper interval on the inner surfaces of the front side wall (2c) and a rear side wall (2d) provided in the longitudinal direction of the drying tank body (2), the protuberances (21) facing inwardly and extending downwardly from the upper opening edge of the body (2) near the aforesaid rotary shaft (12), and being fixed on the side walls (2c), (2d) by welding or the like manner. The protuberances (21) have fitting grooves (22) facing inwardly, so that the partition (20) is fit at its one end (20a) and the other end (20b) into the fitting grooves (22) of a pair of protuberances (21) each on the side walls (2c) and (2d) and facing to each other and pushed down to be assembled in the drying room (7).

Figure 2:
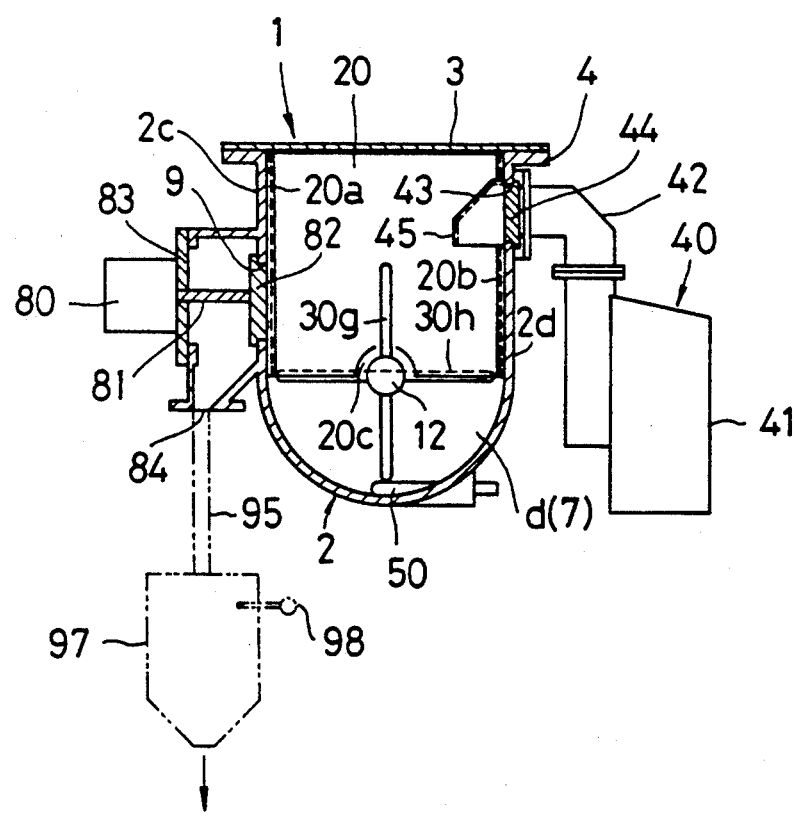
FIG. 2 is a longitudinally sectional view taken in the line II—II in FIG. 1.

The partition (20) is cut in an arcuated shape (20c) centrally at the bottom, as shown in FIG. 2, to be prevented from contacting with the rotary shaft (12).

In the first embodiment, three partitions (20) are used to define four drying zones (a), (b), (c) and (d). Use of the partitions (20) may be selectively increased or decreased to provide a desired number of drying zones, for example, two drying zones by one partition (20), three drying zones by two partitions (20) and so on.

Specific constructions of the partitions (20) for defining a plurality of drying zones and a mounting structure for the partition (20) or the like may be modified in design according to an aimed purpose.

In the drying zones (a), (b), (c) and (d), respective agitating blades (30a), (30b), (30c), (30d), (30e), (30f), (30g), (30h) each substantially in a hair pin-like shape are mounted in line with and around the rotary shaft (12).

The agitating blades (30a) to (30h) are alternately changed in orientation to be angularly displaced with each other every 90° and are so arranged that respective pairs of the agitating blades are disposed in each drying zone and the blades in each pair face with each other.

The agitating blades (30a) to (30h) may be properly changed in design regarding their specific shape, the number of blades or the like.

The drying zones (a), (b), (c), (d) are provided with microwave application units (40) known to public, so that microwaves generated by a magnetron oscillator (41) are sent into a corresponding drying zone (the zone (d) in FIG. 2 through a microwave guide line (42). The microwave application unit (40) are connected with a power monitor for monitoring microwaves, an isolator for protecting an oscillator unit and a matching unit for effectively using microwave power and the like in addition to the above microwave guide (42).

In the present embodiment, as shown in FIG. 2, to power supply ports (43) formed at the front side wall (2c) and the rear side wall (2d) are connected utmost ends of the microwave guide (42) through a partition

(44) which is made of material, such as Teflon or glass that allows microwaves to pass therethrough but not so for the powdered or granular materials. A hood (45) made of aluminium is projected into the drying room (7) (the drying zones) from the partition (44) to allow microwaves to be effectively applied in the drying room.

Each pair of the microwave application units (40) are mounted on the front side wall (2c) and the rear side wall (2d) respectively in such manner that the units (42) are arranged alternately. The mounting positions of the microwave application units (40) should not be limited to this feature.

Each one temperature sensor (50) corresponding to the respective microwave application units (40) is disposed near the bottom of the drying tank (1) near the mounting positions of the microwave application units (40) in the drying zones (a), (b), (c), (d). The temperature sensors may selectively employ thermo couple, Pt temperature element or the like.

Figure 7:
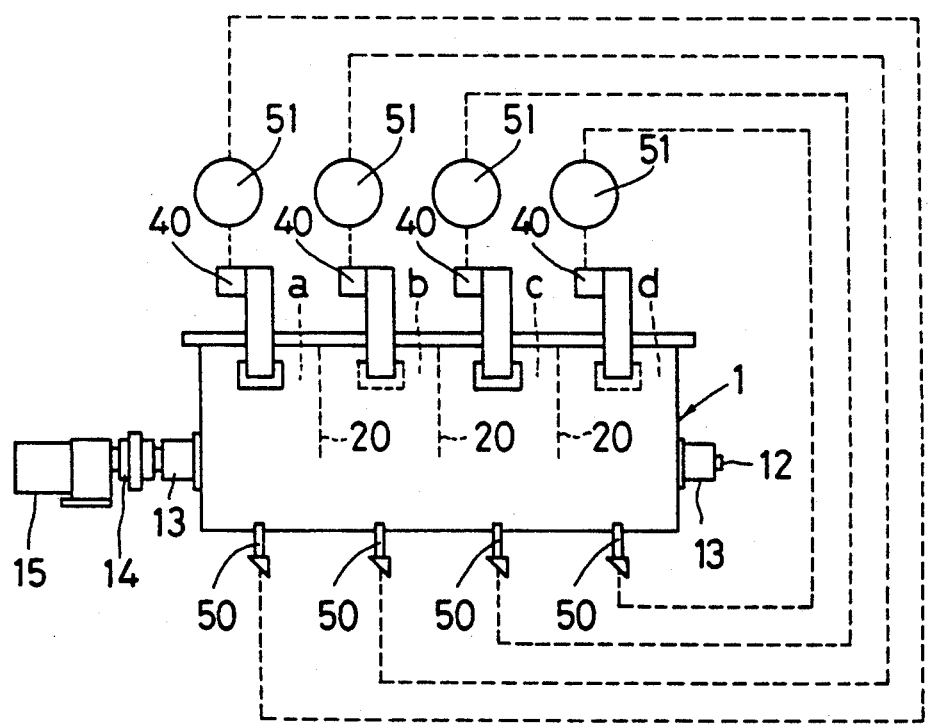
FIG. 7 is a chart of a control circuit for the first embodiment shown in FIG. 1.

Each temperature sensor (50) is, as schematically shown in FIG. 7, provided for the respective drying zones (a), (b), (c), (d) and electrically connected to the microwave application unit (40) through a temperature adjuster (51), so that the material placed in the drying tank (1) is heated to a temperature set by the temperature adjuster (51) according to detection of heating temperatures carried by the temperature sensors (50).

A short pipe (18) where the material inlet 8 is formed has a flange (18a) at the upper end which flange (18a) is coupled, by use of tightening member, such as bolts and nuts, with a lower flange (60b) formed at a lower end of a weighing apparatus (60), such as a rotary feeder, for quantitatively supplying the materials. Also, an upper flange (60a) formed at the upper end of the weighing apparatus (60) is similarly coupled by use of the tightening member with a flange (70a) formed at lower end of a material supply source (70) such as a hopper, a silo or the like.

A material outlet (9) of the drying tank (1) is formed, as shown in FIGS. 1 and 2, above an axis of a rotary shaft (12) at the other and remote end (the downstream side) of the drying tank (1). The material outlet (9) is closed by an outlet valve (82) connected at the utmost end of a piston rod (81) of a hydraulic cylinder (80), such as an air cylinder or the like, mounted to a material exhaust casing (83). Responsive to a material request signal from a next process, the outlet valve (82) is opened to cause the dried materials to be discharged to the next process. Simultaneously with opening of the outlet valve (82), the weighing apparatus (60) is actuated to supply into the drying room (7) undried materials of the same amount as the dried materials discharged to the next process.

In detail, responsive to a material request signal transmitted from a level meter (98) mounted to a receiving hopper (97) connected to an exhaust port (84) of the material exhaust casing (83) through a piping (95) as shown by a phantom line in FIG. 2, the piston rod (81) of the hydraulic cylinder (80) is actuated to open the outlet valve (82), thereby causing the materials heated by microwaves and dried to overflow the material outlet (9) and be discharged through the exhaust port (84) of the casing (83) to the receiving hopper (97).

According to the overflow type of construction, irrespective of that the outlet valve (82) is closed or open, the materials can be fully subjected to heating by microwaves and agitation by the agitating blades (30a) to (30h), and the level of materials in the drying room (7) can be kept constant.

Figure 8:
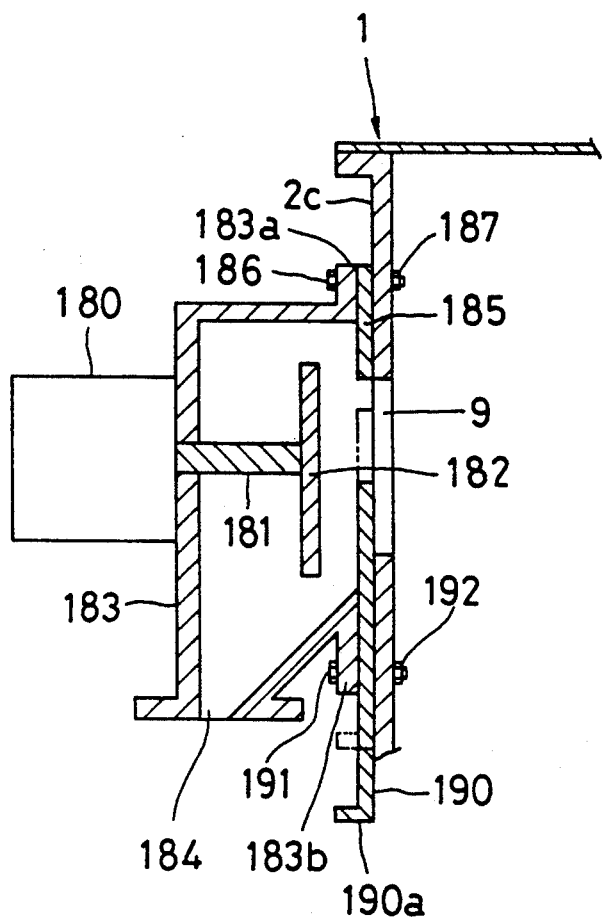
FIG. 8 is a longitudinally sectional view of a principal portion of a modified embodiment of the material discharging means.

The aforesaid material exhaust means may employ such a feature as exemplified in FIG. 8 that can change sectional area of the opening of the material outlet (9).

As seen in FIG. 8, a material exhaust casing (183) is mounted at the outside of the material outlet (9) at the front side wall (2c) of the drying tank body (2), interposing therebetween a slider (190) having an insertion plate (185) at the upper part and a grip portion (190a) at the lower part, to communicate the material outlet (9) with an exhaust port (184). The insertion plate (185) is placed between an upper flange (183a) of the material exhaust casing (183) and the front side wall (2c) to be fixed by use of a bolt (186) and a nut (187). The slider (190) has a longitudinally extending elongated bore (not shown) at its part near the right side wall. The slider (190) is interposed between a lower flange (183b) of the material exhaust casing (183) and the front side wall (2c) of the tank body (2) in a manner of being capable of moving upwardly and downwardly and positioned at a predetermined height by use of a bolt (191) inserted into the elongated bore and a nut (192) screwed with an utmost end of the bolt (191). Hence, the slider (190) is moved upwardly or downwardly to change sectional area of the opening of the material outlet (9) for adjusting the level of the materials to overflow and be discharged from the material outlet (9). The slider (190) may use a separate construction. In FIG. 8, (180) is a hydraulic cylinder, (181) a piston rod and (182) an outlet valve.

Near the lower end of the right side wall (2b) at the downstream side of the drying tank (1) is mounted a residue disposal means (85) comprising a residue exhaust casing (86) constructed almost similarly with the material exhaust means shown in FIG. 1 and having an exhaust port (87) and a hydraulic cylinder (88) provided with a piston rod (89) having an exhaust valve (90) at its utmost end. The exhaust valve (90) opens and closes a residue outlet (91) formed on the right side wall (2b) of the drying tank (1). The residue disposal means (85) causes the whole amount of materials remaining in the tank (1) to be exhausted through the residue outlet (91) after finish of the drying operation.

The weighing apparatus (60), such as a rotary feeder, is connected to the drying tank (1) at the side of the material inlet (8) for supplying materials from the upper side of the weighing apparatus (60). In case that the weighing apparatus (60) including the rotary feeder or the like is adapted to be changeable of its rotation number, the amount of materials to be supplied to the material inlet (8) by the weighing apparatus (60) can be selectively adjusted.

The driving source (15) for the rotary shaft (12) may use those operating with a fixed rotation number but preferably those changeable of the rotation number. In case of using a driving source (15) changeable of the rotation number, the operation (agitation) speed of the rotary shaft (12), in turn, the agitating blades (30a) to (30h) provided by the driving source (15) can be adjusted to a proper operation speed, so that the powdered or granular materials are prevented from being broken.

In the drying tank (1) are provided an inlet (100) and an outlet (101) for allowing carrier gas, such as dehumidifying air or the like, to flow therethrough for exhausting to the outside of the system evaporated water or the like from the materials in the drying room (7). In detail, water or the like of the materials are evaporated by heating with microwaves and the water together with dehumidifying air supplied from the inlet (100) are discharged from the outlet (101).

The level meter (16) shown in FIG. 1 is adapted to detect the level of the materials supplied in the drying tank (1), and a level meter (17) provided at the material supply source (70) is adapted to detect the level of the materials placed in the material supply source (70).

Second Embodiment

Figure 9:
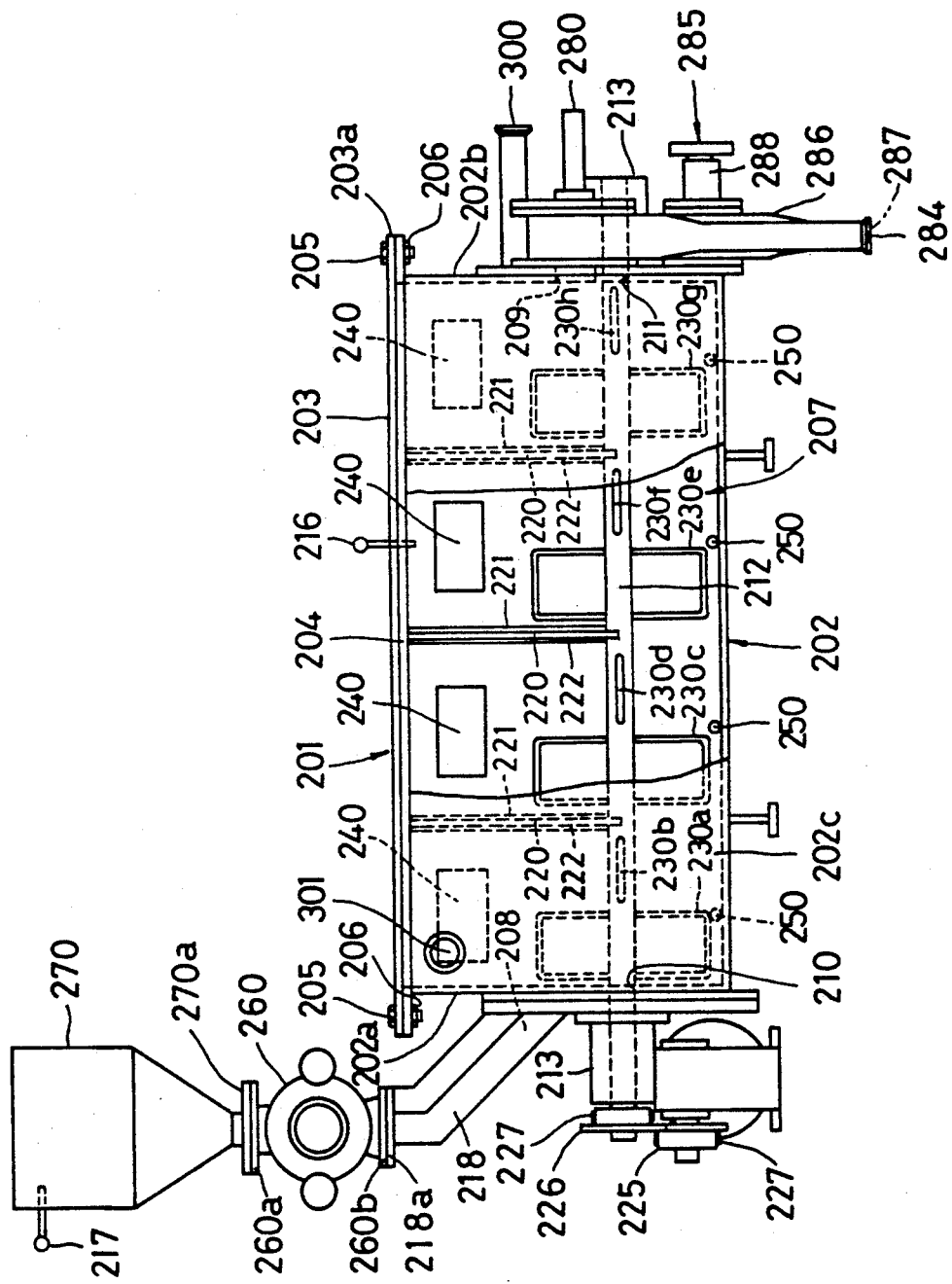
FIG. 9 is a partially longitudinally sectional front view of a principal portion of the second embodiment.
Figure 10:
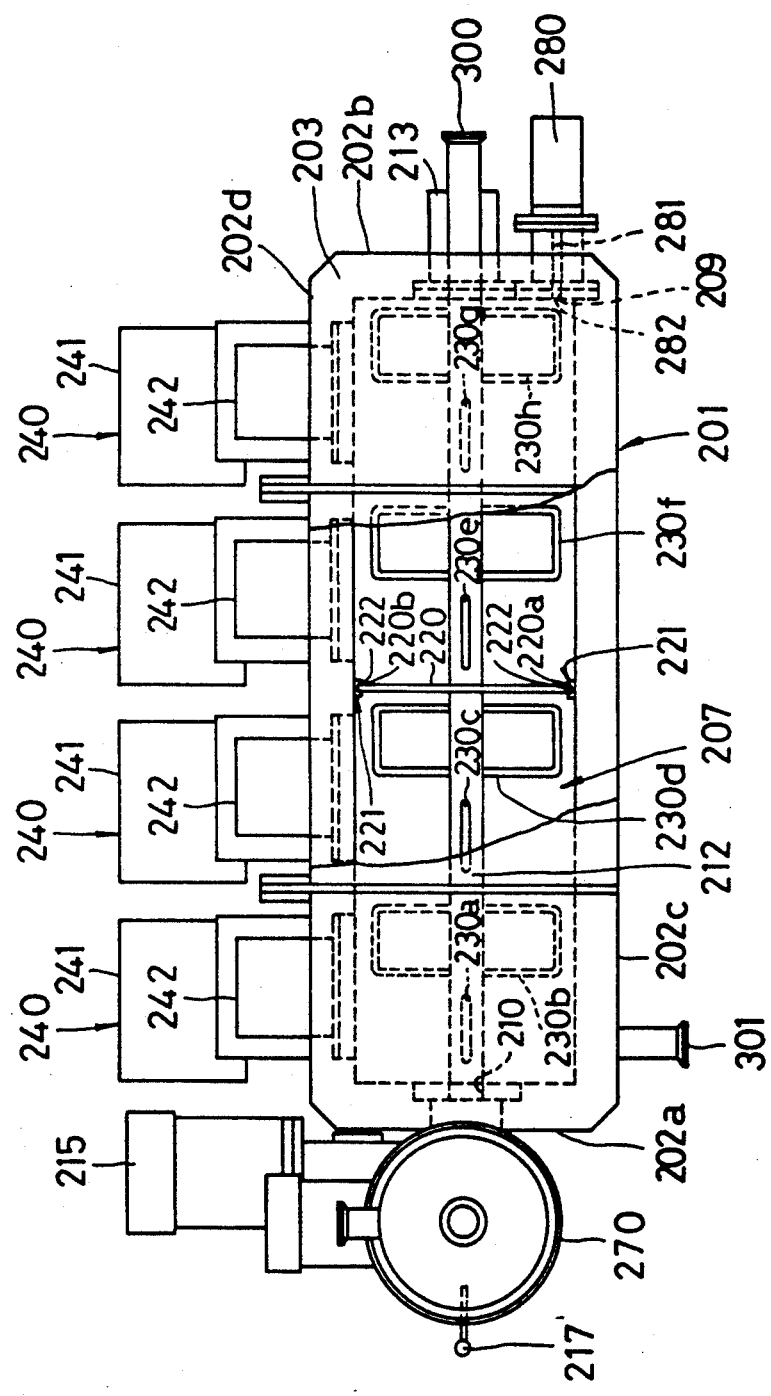
FIG. 10 is a plan view of the second embodiment shown in FIG. 9 with the lid member being partially cut off.
Figure 11:
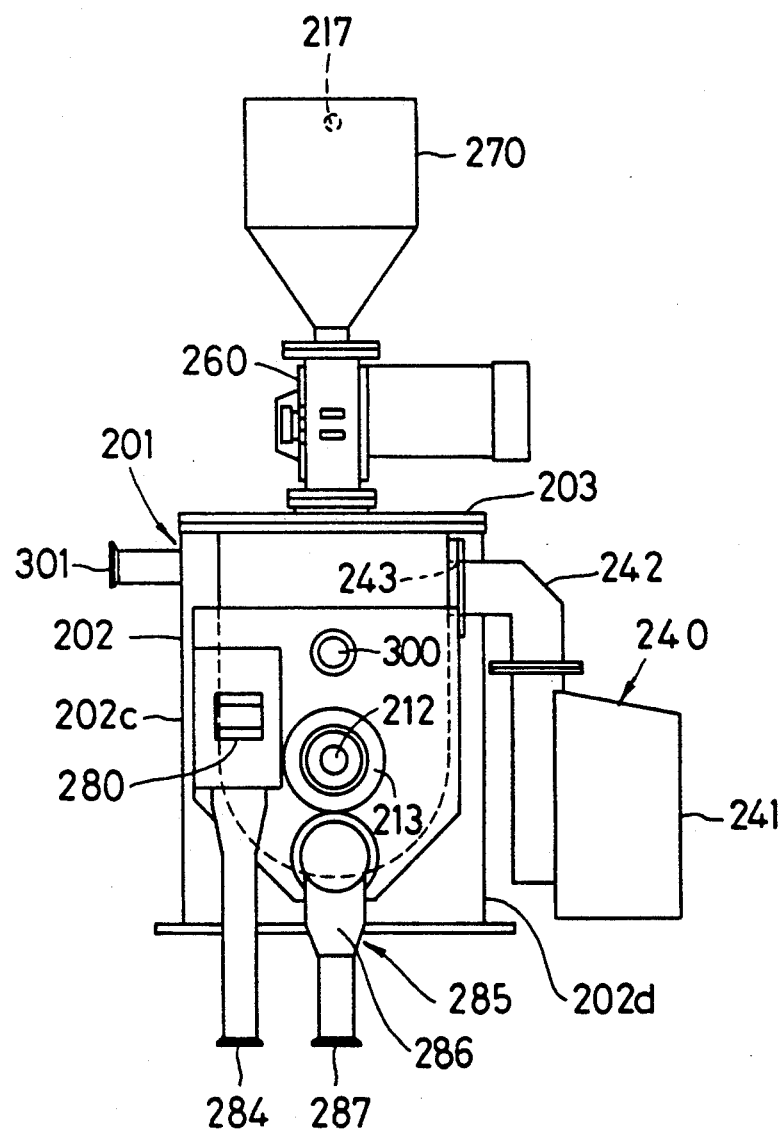
FIG. 11 is a right side view of the second embodiment of FIG. 9.

FIGS. 9, 10 and 11 show the second embodiment of the present invention.

The second embodiment is constructed substantially similarly with the first embodiment except that: microwave application units (240) are provided only at one of front and rear side walls (202c), (202d) of drying tank body (202) of drying tank (201); material outlet (209), hydraulic cylinder (280), piston rod (281), outlet valve (282) and exhaust port (284) for causing the materials dried by microwaves in a drying room (207) to overflow and be discharged to the outside of the system are provided on a right side wall (202b) of the drying tank (201); a driving source (215) for rotating a rotary shaft (212) journalled at both ends by bearings (213) to rotate agitating blades (230a) to (230h) is disposed rearwardly of the rear side wall (202d) of the drying tank (201); and a driving chain (227) is stretched between a sprocket (225) connected to a driving shaft of the driving source (215) and a sprocket (226) fit onto one end of the rotary shaft (212) to rotate the rotary shaft (212) by means of a driving force of the driving source (215).

In FIGS. 9, 10 and 11, (202) is a drying tank body having a left side wall (202a), right side wall (202b), front side wall (202c) and rear side wall (202d), (203) a lid member for covering the upper opening of the drying body (202), (204) an upper annular flange of the body (202) to be coupled with an outer peripheral end (203a) of the lid member (203) by use of bolts (205) and nuts (206), (208) a material inlet, (210) and (211) shaft bores for the rotary shaft (212), (216) a level meter constructed similarly with that (16) in FIG. 1, (217) a level meter constructed similarly with that (17) in FIG. 1, (218) a short pipe for the material inlet (208) having a flange (218a), (220) partitions having one end (220a) and the other end (220b), (221) elongated protuberances having fitting grooves (222) into which the partitions (220) are fit, (230a) to (230h) agitating blades, (240) microwave application units comprising a magnetron oscillator (241), microwave guide (242) or the like, (243) power supply ports, (250) temperature sensors connected with temperature adjusters (not shown) to form an electric circuit similar with that shown in FIG. 7, (260) a weighing apparatus, such as a rotary feeder, having an upper flange (260a) and a lower flange (260b), (270) a material supply source having a flange (270a), (285) a residue disposal means comprising a residue exhaust casing having an exhaust port (287) and a hydraulic cylinder (288) provided with a piston rod (not shown) having an exhaust valve (not shown) at utmost end as those of the first embodiment, and (300) a carrier gas inlet for dehumidifying air or the like and (301) a carrier gas outlet.

Next, operation of the present invention will be referred to according to the first embodiment.

The material to be dried fed from the material supply source (70) is weighed by the weighing apparatus (60) and fed into the drying room (7) of the drying tank (1) through the material inlet (8) while being agitated by the agitating blades (30a) to (30h). When the level meter (16) detects the fact that the amount of material supplied in the drying room (7) reaches to a desired amount, the weighing apparatus (60) stops supplying of the materials and the microwave application units (40) provided in the drying zones (a), (b), (c) and (d) start to apply microwaves to the materials to heat them. Heating temperature in the drying zones (a), (b), (c), (d) in this instance can be adjusted separately by the respective temperature adjusters (51) on the basis of specific temperatures detected by the respective temperature sensors (50). In detail, when detected temperatures of the drying zones are the same, the temperature adjusters (51) may be adjusted to cause the materials in the drying zones to be heated and dried at the same temperature. When the specific detected temperatures are different from each other, the adjusters (51) are controlled to cause the materials to be heated at separate temperatures corresponding to the specific temperatures of the drying zones.

With the temperature sensors (50) in the drying zones (a), (b), (c) and (d) detecting the heating temperatures for the material placed therein, the microwave application units (40) heat the material to specific temperatures set by the temperature adjusters (51). When temperatures of the respective drying zones separately reach to the set temperatures, the material placed in the drying room (7) is dried at a uniform temperature and the microwave application units (40) stop application of microwaves. The microwave application units (40) are thereafter controlled for keeping the set temperatures through repeated on and off operation.

When temperatures of all the drying zones (a), (b), (c) and (d) reach to the set temperatures, undried material is fed into the drying room (7) through the material supply source (70), weighing apparatus (60) and material inlet (8) responsive to a material request signal from the next process (a signal output by the level meter (98) mounted at the receiving hopper (97) shown in FIG. 2 and indicating reduction of the materials), while the material heated and dried to a predetermined temperature overflows and is continuously discharged from the material outlet (9). In this instance, the outlet valve (82) for opening and closing the material outlet (9) is opened and closed following the signals from the level meter (98) mounted to the receiving hopper (97) of the next process as aforesaid.

When supply of the material request signals from the next process is stopped, operation of the weighing apparatus (60) is stopped simultaneously to thereby stop supply of undried material from the material supply source (70) to the material inlet (8), so that the material placed in the drying room (7) is heated to predetermined temperatures separately in the respective drying zones and thereafter kept at the predetermined temperatures. Then, the next operations are repeatedly carried out as aforesaid.

When the material remaining in the drying room (7) is desired to be exhausted, the weighing apparatus (60) is closed and the exhaust valve (90) of the residue disposal means (85) is opened.

Next, applied examples of the apparatus for drying powdered or granular materials of the first embodiment according to the present invention will be detailed with referring to the accompanied drawings FIGS. 12, 13, 14, 15 and 16.

Figure 12:
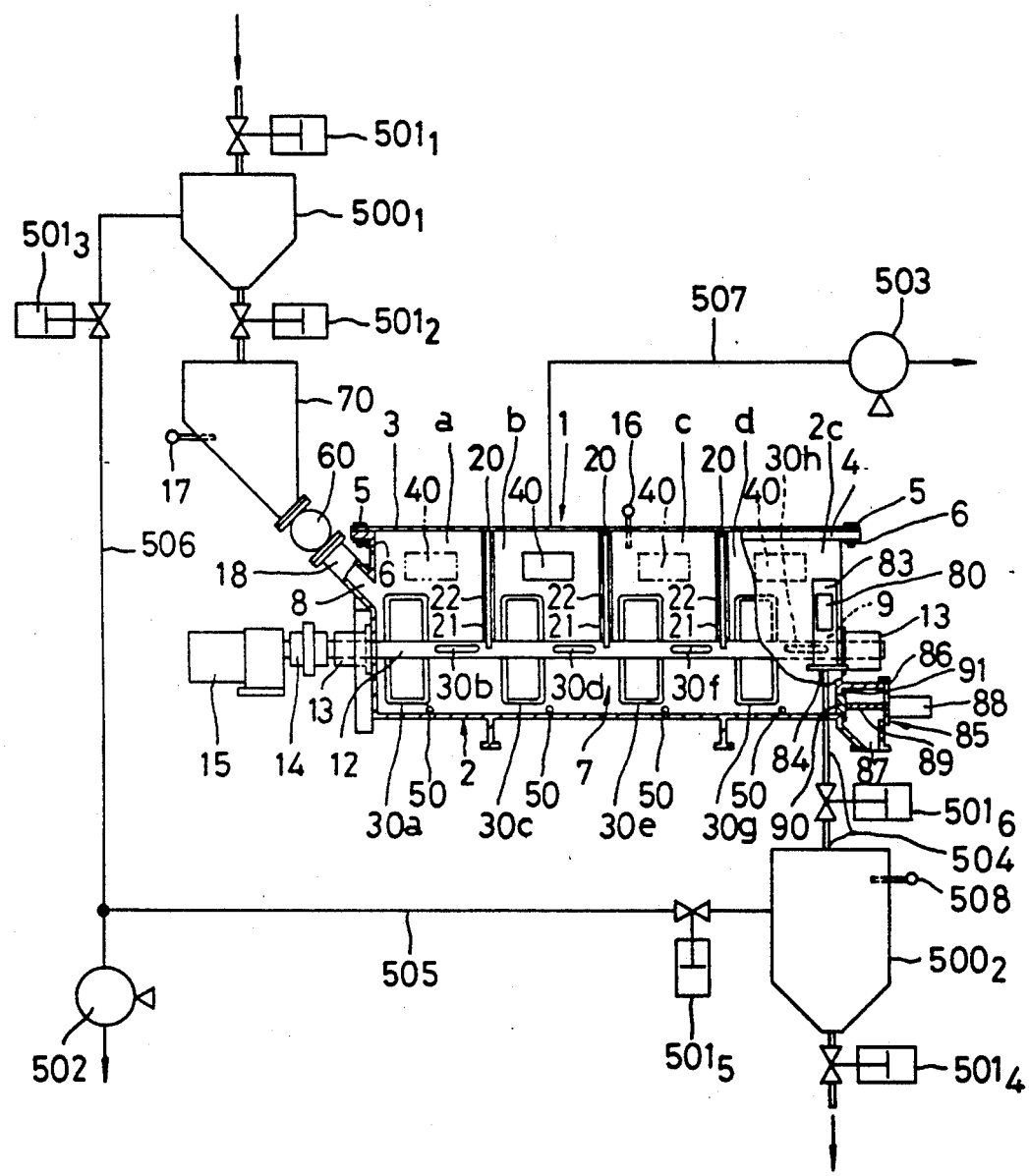
FIG. 12 is a partially sectional schematic front view showing a first application example of the present invention.

FIG. 12 shows a vacuum continuous drying system wherein the inside of the drying tank (1) is provided with a sealed construction and the material inlet (8) and material outlet (9) are connected with cushion hoppers (500₁), (500₂), valves (501₁), (501₂), (501₃), (501₄), (501₅), (501₆) and vacuum pumps (502), (503) or the like usually required in this kind of vacuum process to provide the drying system with a feature for operation in vacuum condition, so that water or the like evaporated from the powdered or granular materials in the drying room (7) are discharged to the outside of the system. The drying system is not provided with the carrier gas inlet (100), (300) and outlet (101), (301) shown in the first and second embodiments, so that water or the like of the materials in the drying room (7) is discharged to the outside of the system without use of carrier gas.

In FIG. 12, there is formed a closed line comprising a cushion hopper (500₁) at the upstream side of the material supply source (70), the supply source (70), the weighing apparatus (60), the drying tank (1), and the outlet side cushion hopper (500₂) connected to the material outlet (9) through a piping (504) and also connected to the cushion hopper (500₁) through pipings (505) and (506), so that water or the like evaporated from the material in the drying room (7) is exhausted to the outside of the system through a piping (507). (508) is a level meter.

Figure 13:
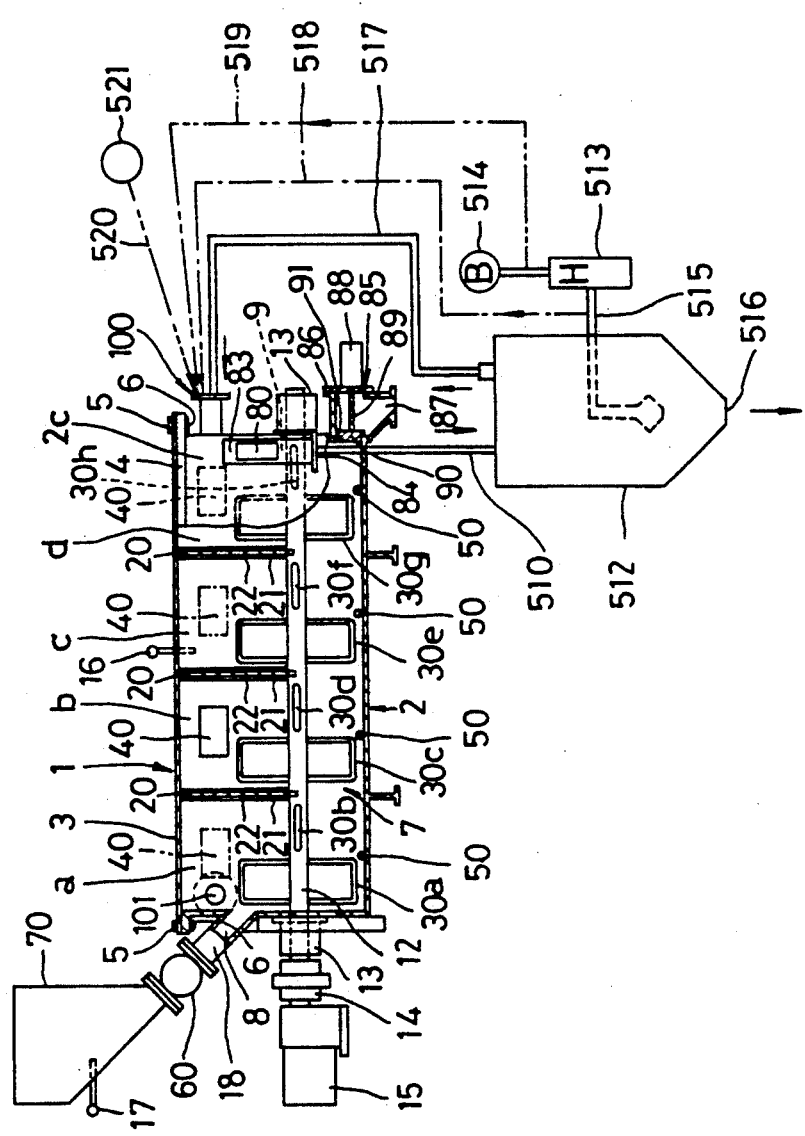
FIG. 13 is a partially sectional schematic front view showing a second application example of the present invention.

The drying system shown in FIG. 13 comprises a drying tank (1) of the same construction as that shown in FIG. 1 and a hopper (512) connected to a material outlet (9) of the drying tank (1) through a piping (510), wherein the hopper (512) is provided with a blower (514) to take in atomospheric air and a heater (513) to heat the atomospheric air to provide dehumidifying air, so that the dehumidifying air is fed into the hopper (512) through a dehumidifying air introduction pipe (515) to allow the materials placed in the hopper (512) not to take in water and be discharged through a material outlet (516). The dehumidifying air directed in the hopper (512) is sent to a carrier gas inlet (100) through an exhaust pipe (517), so that water or the like evaporated from the materials placed in the drying tank (1) is exhausted to the outside of the system through a carrier gas outlet (101). Hence, the dehumidifying air used in the case is in single pass type and not to be circulated. Components put with the same reference numerals as of FIG. 1 are the same as those used in FIG. 1.

In FIG. 13, such feature may be provided that dehumidifying air is sent to the carrier gas inlet (100) through a branch pipe (518) branching from the portion of dehumidifying air introduction pipe (515) between the heater (513) and hopper (512), or through a branch pipe (519) branching from a portion between the blower (514) and heater (513), or that compressed air from a pipe (520) connected with a compressor (521) is fed into the carrier gas inlet (100). Also, although not shown, a dehumidifying apparatus may be connected to the upstream side of the blower (514).

Figure 14:
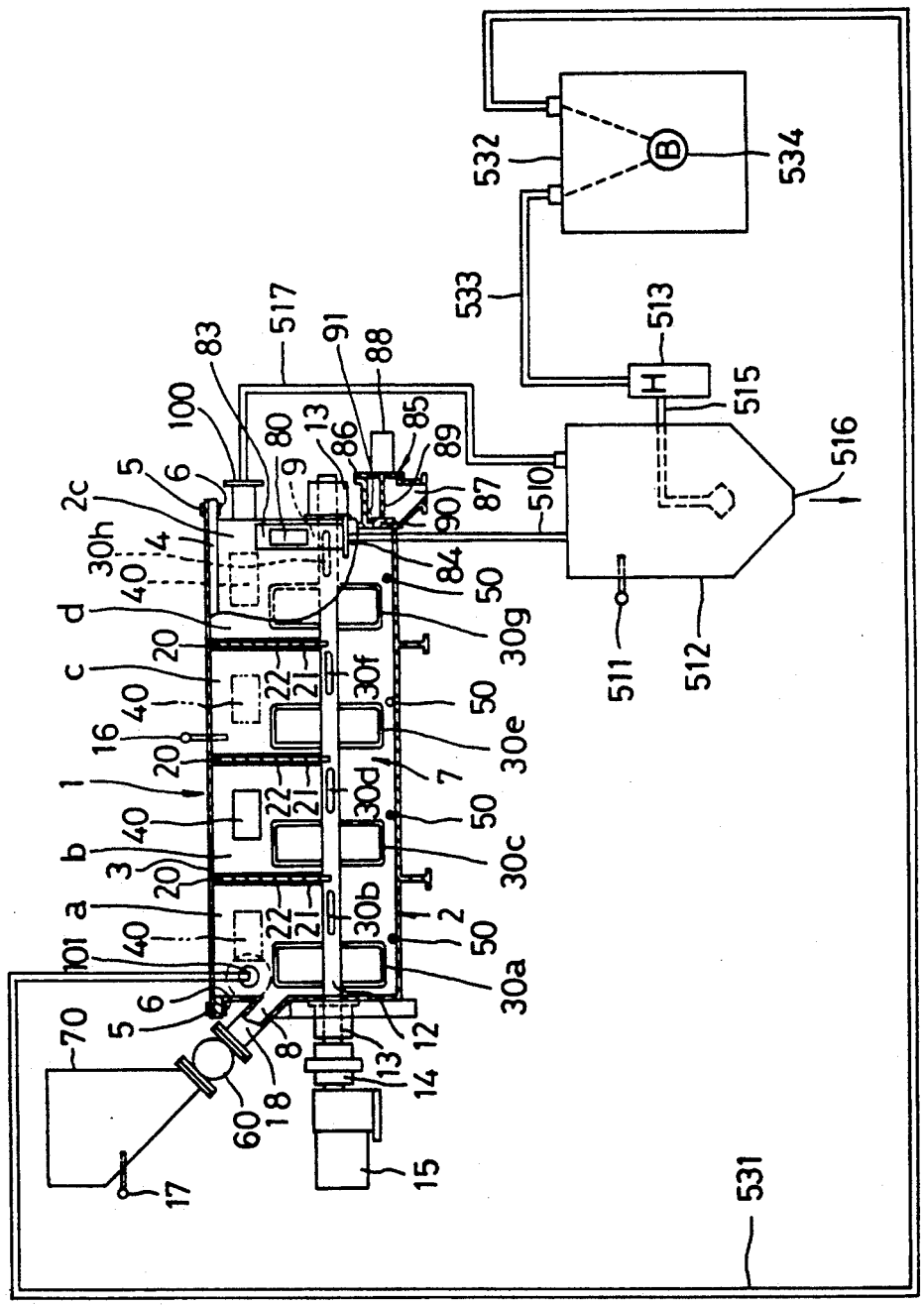
FIG. 14 is a partially sectional schematic front view showing a third application example of the present invention.

The system shown in FIG. 14 is characterized in the feature of circulation line of dehumidifying air while the aforesaid system in FIG. 13 feeds dehumidifying air into the drying tank (1) in the single pass style. In the circulation line, a carrier gas, such as dehumidifying air, fed through a carrier gas inlet (100) is circulated, through a circulation piping (531) which connected at one end with the carrier gas outlet (101) and at the other end with a dehumidifying apparatus (532), another circulation piping (533) which connected at one end with the dehumidifying apparatus (532) and at the other end with a heater (513), and a hopper (512) and an exhaust pipe (517) each constructed similarly with those of FIG. 13, to the carrier gas inlet (100). The same reference numerals as in FIG. 13 denote the same features. (511) is a level meter for the hopper (512).

In the system shown in FIG. 14, the humidifying apparatus (532) is a customarily available one and houses therein a blower (534) as schematically illustrated and connected at its suction side with the other end side of the circulation piping (531) and at the discharge side with the one end side of the another circulation piping (533).

Figure 15:
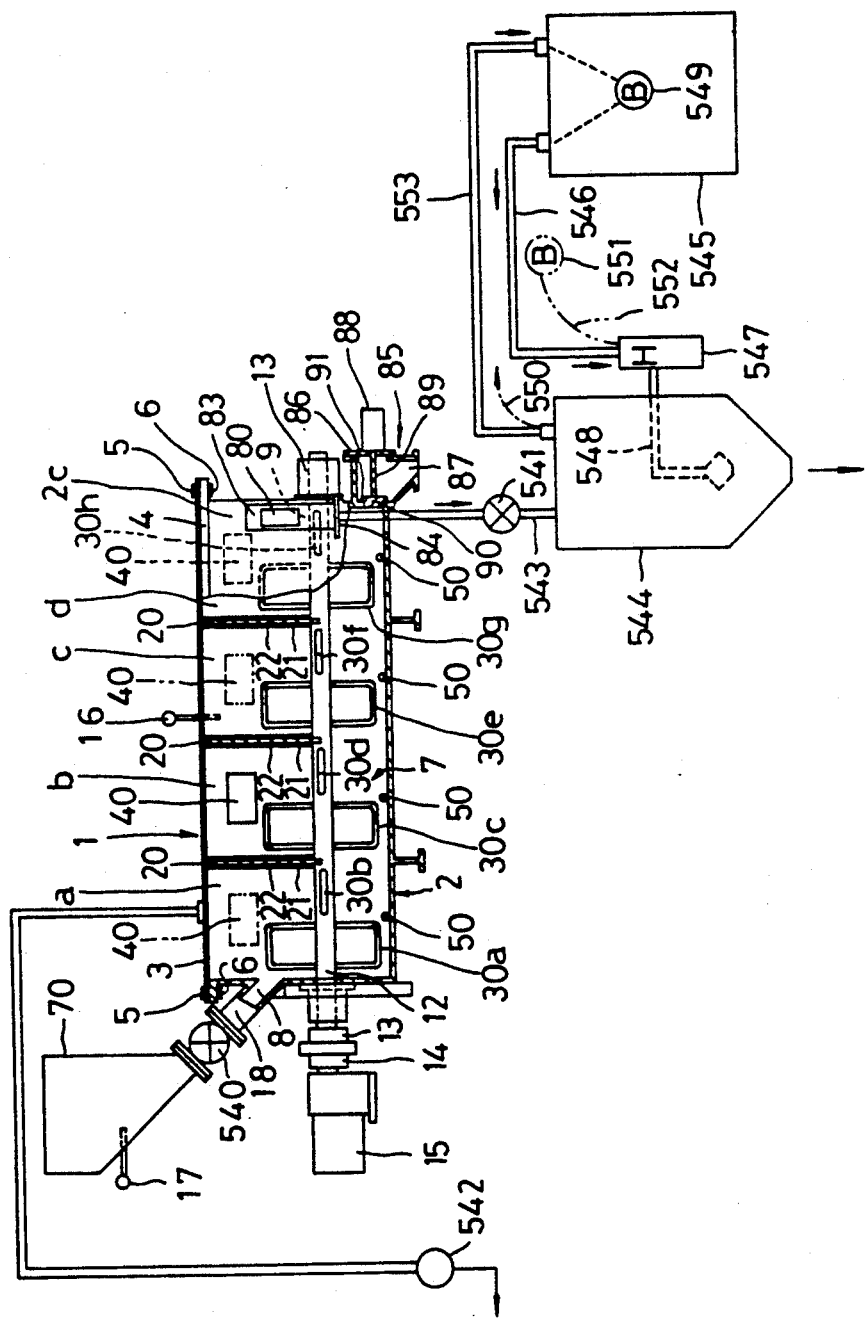
FIG. 15 is a partially sectional schematic front view showing a fourth application example of the present invention.
Figure 16:
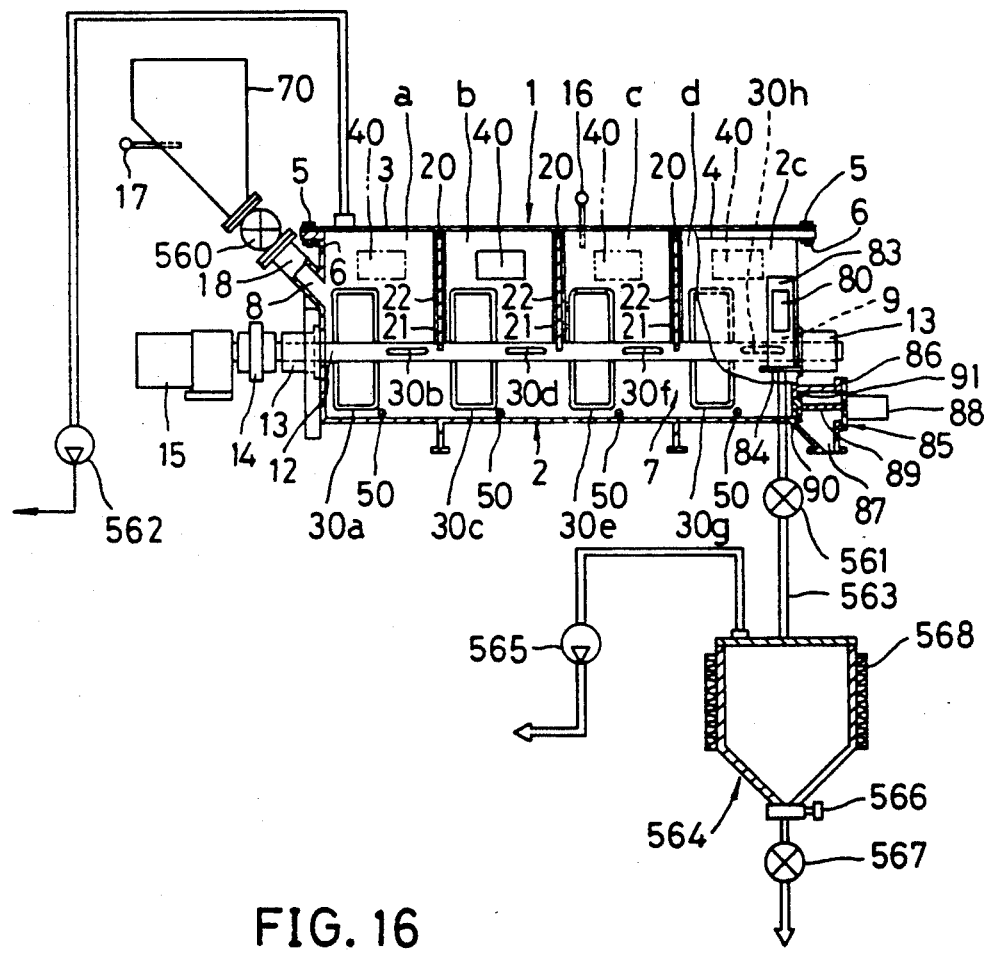
FIG. 16 is a partially sectional schematic front view showing a fifth application example of the present invention.

Both of the drying systems shown in FIGS. 15 and 16 do not use the carrier gas as in the systems shown in FIGS. 13 and 14 but have the same feature that the inside of the drying tank (1) is set in reduced pressure or vacuum condition to cause water or the like evaporated from the materials in the drying room (7) to be exhausted to the outside of the system.

In the system shown in FIG. 15, each valve (540) and (541) is connected to the material inlet (8) and outlet (9) of the drying tank (1) respectively. A suction air source (542), such as a vacuum pump, blower or the like, is connected to a part near the material inlet (8) to bring the inside of the drying tank (1) into reduced pressure condition, thereby causing water or the like in the drying room (7) to be exhausted to the outside of the system. In this case, the valves (540), (541) prevent leakage of air and ensure a continuous supply of the materials.

A hopper (544) is connected to the remote end of a piping (543) connected at one end to the material outlet (9), to which hopper (544) is fed from an utmost end of a dried air supply pipe (548) dried air which provided by dehumidifying air with a known dehumidifying apparatus (545) and heating the air in a piping (546) with a heater (547). The hopper (544) is connected at its upper part with an exhaust pipe (553) whose utmost end is connected to a suction por of a blower (549) which is mounted to the dehumidifying apparatus (545) and connected at its discharge port to the piping (546). Hence, air dehumidified and dried by the dehumidifying apparatus (545) and the heater (547) is fed into the hopper (544), and waste gas from the hopper (544) is guided to the exhaust pipe (553) and the dehumidifying apparatus (545) to be used repeatedly. The same reference numerals as those in FIG. 1 denote the same feature.

The feature of the system shown in FIG. 15 may be modified as that the utmost end of the exhaust pipe (553) connected to the hopper (544) is not connected to the dehumidifying apparatus (545) but serves to exhaust waste gas to the outside of the system as denoted by (550), or that without provision of the dehumidifying apparatus (545), piping (546), exhaust pipe (553) and blower (549), a blower (551) is connected to the upstream side of the heater (547) through a pipe (552).

In the system shown in FIG. 16, each valve (560) and (561) is connected to the material inlet (8) and outlet (9) of the drying tank (1) respectively, and a suction air source (562) is connected to the drying tank (1), so that the inside of the drying tank (1) is brought into reduced pressure condition. A vacuum hopper (564) or the like is connected to the utmost end of a pipe (563) mounting the valve (561) and is also connected with a suction air source (565), so that the suction air source (565) brings the inside of the hopper (564) into vacuum condition.

In FIG. 16, (566) is a damper, (567) a valve, and (568) a bandage heater wound onto a trunk of the vacuum hopper (564). The same reference numerals used in FIG. 1 denote the same features.

The inside of the drying tank (1) cannot be reduced in pressure so lower since when the drying tank is in reduced pressure condition at lower than 100 Torr, microwaves from a microwave application unit (40) causes discharging at the microwave application port. Hence, the drying tank (1) is set to a reduced pressure condition at more than 100 Torr. The vacuum hopper (564) is reduced in pressure to 1 to $10^{-3}$ Torr to be in vacuum condition.

It will be appreciated that the apparatus for drying powdered or granular materials according to the present invention is applicable also to any other systems than those shown in FIGS. 12 through 16.

In the aforesaid embodiments, the materials placed in the drying tank (1) are heated and dried with microwaves by use of the microwave application unit (40). In case of plastic material, such as uncrystallized PET (polyethylene terephthalate), the heating process serves also as crystallizing process.

What is claimed is:

1. An apparatus for drying powdered or granular materials comprising: a drying tank (1) including a transversely extending drying room (7) adapted to be applied with heating by microwaves and having a material inlet (8) at one end and a material outlet (9) at the other end; at least one partition made of a material that not allow microwaves to pass therethrough and defining more than two drying zones (a ... d) in the drying room (7) of the drying tank (1); a rotary shaft (12) disposed in the drying tank (1) in its longitudinal direction to extend through the drying room (7) in a manner of being freely rotatable and agitating blades (30a), (30b) ... provided on the rotary shaft (12) corresponding to each drying zone (a ... d); microwave application units (40) provided for each drying zone (a ... d); and temperature sensors (50) for each drying zone (a ... d); and corresponding temperature adjusters (51) connected to the respective temperature sensors (50).

2. An apparatus for drying powdered or granular materials as set forth in claim 1, wherein the material outlet (9) of the drying tank (1) is formed above an axis of the rotary shaft (12) at the other and remote end of the tank (1) and is adapted to be usually closed by an outlet valve (82) through a cylinder (80) operable by a fluid pressure and to be opened with the outlet valve (82) following a material request signal from a next process, thereby causing the dried materials to overflow the material outlet (9).

3. An apparatus for drying powdered or granular materials as set forth in claim 2, wherein at the outside of the material outlet (9) of the drying tank (1) is mounted a slider (190) for changing sectional area of the opening of the material outlet (9).

4. An apparatus for drying powdered or granular materials as set forth in claim 1 or 2, wherein a weighing apparatus (60) is connected to the drying tank (1) at the side of the material inlet (8), so that the materials are fed from the upper side of the weighing apparatus (60).

5. An apparatus for drying powdered or granular materials as set forth in claim 3, wherein a weighing apparatus (60) is connected to the drying tank (1) at the side of the material inlet (8), so that the materials are fed from the upper side of the weighing apparatus (60).

6. An apparatus for drying powdered or granular materials as set forth in claim 4, wherein the weighing apparatus (60) is changeable of the rotation number.

7. An apparatus for drying powdered or granular materials as set forth in claim 5, wherein the weighing apparatus (60) is changeable of the rotation number.

8. An apparatus for drying powdered or granular materials as set forth in claim 1 or 2, wherein a driving source (15) is changeable of the rotation number of the rotary shaft (12).

9. An apparatus for drying powdered or granular materials as set forth in claim 3, wherein a driving source (15) is changeable of the rotation number of the rotary shaft (12).

10. An apparatus for drying powdered or granular materials as set forth in claim 4, wherein a driving source (15) is changeable of the rotation number of the rotary shaft (12).

11. An apparatus for drying powdered or granular materials as set forth in claim 5, wherein a driving source (15) is changeable of the rotation number of the rotary shaft (12).

12. An apparatus for drying powdered or granular materials as set forth in claim 6, wherein a driving source (15) is changeable of the rotation number of the rotary shaft (12).

13. An apparatus for drying powdered or granular materials as set forth in claim 7, wherein a driving source (15) is changeable of the rotation number of the rotary shaft (12).

14. An apparatus for drying powdered or granular materials as set forth in claim 1 or 2, wherein an inlet (100) and an outlet (101) for carrier gas are provided at the drying tank (1) for exhausting gas in the drying room (7) to the outside of the system.

15. An apparatus for drying powdered or granular materials as set forth in claim 5 or 7, wherein an inlet (100) and an outlet (101) for carrier gas are provided at the drying tank (1) for exhausting gas in the drying room (7) to the outside of the system.

16. An apparatus for drying powdered or granular materials as set forth in claim 11, wherein an inlet (100) and an outlet (101) for carrier gas are provided at the drying tank (1) for exhausting gas in the drying room (7) to the outside of the system.

17. An apparatus for drying powdered or granular materials as set forth in claim 1 or 2, wherein the inside of the drying tank (1) is provided with a sealed construction, and the material inlet (8) and the material outlet (9) are connected with cushion hoppers ($500_1$), ($500_2$), valves ($500_{1-6}$) and vacuum pumps (502), (503) to provide the system with a feature for operation in vacuum condition, thereby exhausting gas in the drying room (7) to the outside of the system.

18. An apparatus for drying powdered or granular materials as set forth in claim 5 or 7, wherein the inside of the drying tank (1) is provided with a sealed construction, and the material inlet (8) and the material outlet (9) are connected with cushion hoppers ($500_1$), ($500_2$), valves ($500_{1-6}$) and vacuum pumps (502), (503) to provide the system with a feature for operation in vacuum condition, thereby exhausting gas in the drying room (7) to the outside of the system.

19. An apparatus for drying powdered or granular materials as set forth in claim 11, wherein the inside of the drying tank (1) is provided with a sealed construction, and the material inlet (8) and the material outlet (9) are connected with cushion hoppers ($500_1$), ($500_2$), valves ($500_{1-6}$) and vacuum pumps (502), (503) to provide the system with a feature for operation in vacuum condition, thereby exhausting gas in the drying room (7) to the outside of the system.

20. An apparatus for drying powdered or granular materials as set forth in claim 1 or 2, wherein each of the material inlet (8) and the material outlet (9) of the drying tank (1) are coupled with valves (540) and (541) respectively, and the drying tank (1) is connected with a suction air source (542), so that the suction air source (542) brings the inside of the drying tank (1) into reduced pressure condition, thereby exhausting gas in the drying room (7) to the outside of the system.

21. An apparatus for drying powdered or granular materials as set forth in claim 5 or 7, wherein each of the material inlet (8) and the material outlet (9) of the drying tank (1) are coupled with valves (540) and (541) respectively, and the drying tank (1) is connected with a suction air source (542), so that the suction air source (542) brings the inside of the drying tank (1) into reduced pressure condition, thereby exhausting gas in the drying room (7) to the outside of the system.

22. An apparatus for drying powdered or granular materials as set forth in claim 11, wherein each of the material inlet (8) and the material outlet (9) of the drying tank (1) are coupled with valves (540) and (541) respectively, and the drying tank (1) is connected with a suction air source (542), so that the suction air source (542) brings the inside of the drying tank (1) into reduced pressure condition, thereby exhausting gas in the drying room (7) to the outside of the system.

23. An apparatus for drying powdered or granular materials as set forth in claim 1 or 2, wherein each of the material inlet (8) and the material outlet (9) of the drying tank (1) are coupled with valves (560) and (561) respectively, and the drying tank (1) is connected with a suction air source (562), so that the suction air source (562) brings the inside of the drying tank (1) into reduced pressure condition, and a vacuum hopper (564) is connected to the utmost end of a pipe (563) connected with the valve (561) and is also connected with a suction air source (565), so that the suction air source (565) brings the inside of the vacuum hopper (564) into a vacuum condition.

24. An apparatus for drying powdered or granular materials as set forth in claim 5 or 7, wherein each of the material inlet (8) and the material outlet (9) of the drying tank (1) are coupled with valves (560) and (561) respectively, and the drying tank (1) is connected with a suction air source (562), so that the suction air source (562) brings the inside of the drying tank (1) into reduced pressure condition, and a vacuum hopper (564) is connected to the utmost end of a pipe (563) connected with the valve (561) and is also connected with a suction air source (565), so that the suction air source (565) brings the inside of the vacuum hopper (564) into a vacuum condition.

25. An apparatus for drying powdered or granular materials as set forth in claim 11, wherein each of the material inlet (8) and the material outlet (9) of the drying tank (1) are coupled with valves (560) and (561) respectively, and the drying tank (1) is connected with a suction air source (562), so that the suction air source (562) brings the inside of the drying tank (1) into reduced pressure condition, and a vacuum hopper (564) is connected to the utmost end of a pipe (563) connected with the valve (561) and is also connected with a suction air source (565), so that the suction air source (565) brings the inside of the vacuum hopper (564) into a vacuum condition.

26. An apparatus for drying powdered or granular materials as set forth in claim 1 or 2, wherein a pipe (510) is connected with the material outlet (9) of the drying tank (1) and is also coupled at the utmost end with a hopper (512) into which hopper is fed through a dehumidifying air introduction line (515) a dehumidifying air provided by heating atomspheric air from a blower (514) by a heater (513), so that water of the materials placed in the hopper (512) is dehumidified and discharged from a material outlet (516), and the dehumidifying air fed in the hopper (512) is sent to a carrier gas inlet (100) through an exhaust pipe (517) and exhausted through a carrier gas outlet (101) to the outside of the system.

27. An apparatus for drying powdered or granular materials as set forth in claim 5 or 7, wherein a pipe (510) is connected with the material outlet (9) of the drying tank (1) and is also coupled at the utmost end with a hopper (512) into which hopper is fed through a dehumidifying air introduction line (515) a dehumidifying air provided by heating atomspheric air from a blower (514) by a heater (513), so that water of the materials placed in the hopper (512) is dehumidified and discharged from a material outlet (516), and the dehumidifying air fed in the hopper (512) is sent to a carrier gas inlet (100) through an exhaust pipe (517) and exhausted through a carrier gas outlet (101) to the outside of the system.

28. An apparatus for drying powdered or granular materials as set forth in claim 11, wherein a pipe (510) is connected with the material outlet (9) of the drying tank (1) and is also coupled at the utmost end with a hopper (512) into which hopper is fed through a dehumidifying air introduction line (515) a dehumidifying air provided by heating atmospheric air from a blower (514) by a heater (513), so that water of the materials placed in the hopper (512) is dehumidified and discharged from a material outlet (516), and the dehumidifying air fed in the hopper (512) is sent to a carrier gas inlet (100) through an exhaust pipe (517) and exhausted through a carrier gas outlet (101) to the outside of the system.

29. An apparatus for drying powered or granular materials as set forth in claim 15, wherein a pipe (510) is connected with the material outlet (9) of the drying tank (1) and is also coupled at the utmost end with a hopper (512) into which hopper is fed through a dehumidifying air introduction line (515) a dehumidifying air provided by heating atmospheric air from a blower (514) by a heater (513), so that water of the materials placed in the hopper (512) is dehumidified and discharged from a material outlet (516), and the dehumidifying air fed in the hopper (512) is sent to a carrier gas inlet (100) through an exhaust pipe (517) and exhausted through a carrier gas outlet (101) to the outside of the system.

30. An apparatus for drying powdered or granular materials as set forth in claim 16, wherein a pipe (510) is connected with the material outlet (9) of the drying tank (1) and is also coupled at the utmost end with a hopper (512) into which hopper is fed through a dehumidifying air introduction line (515) a dehumidifying air provided by heating atmospheric air from a blower (514) by a heater (513), so that water of the materials placed in the hopper (512) is dehumidified and discharged from a material outlet (516), and the dehumidifying air fed in the hopper (512) is sent to a carrier gas inlet (100) through an exhaust pipe (517) and exhausted through a carrier gas outlet (101) to the outside of the system.

31. An apparatus for drying powdered or granular materials as set forth in claim 26, comprising, in place of the exhaust pipe (517), a branch pipe (518) connected at one end with a portion of the dehumidifying air introduction pipe (515) between the heater (513) and the hopper (512) and at the other end with the carrier gas inlet (100).

32. An apparatus for drying powdered or granular material as set forth in claim 27, comprising, in place of the exhaust pipe (517), a branch pipe (518) connected at one end with a portion of the dehumidifying air introduction pipe (515) between the heater (513) and the hopper (512) and at the other end with the carrier gas inlet (100).

33. An apparatus for drying powdered or granular materials as set forth in claim 28, comprising, in place of the exhaust pipe (517), a branch pipe (518) connected at one end with a portion of the dehumidifying air introduction pipe (515) between the heater (513) and the hopper (512) and at the other end with the carrier gas inlet (100).

34. An apparatus for drying powdered or granular materials as set forth in claim 29, comprising, in place of the exhaust pipe (517), a branch pipe (518) connected at one end with a portion of the dehumidifying air introduction pipe (515) between the heater (513) and the hopper (512) and at the other end with the carrier gas inlet (100).

35. An apparatus for drying powdered or granular materials as set forth in claim 30, comprising, in place of the exhaust pipe (517), a branch pipe (518) connected at one end with a portion of the dehumidifying air introduction pipe (515) between the heater (513) and the hopper (512) and at the other end with the carrier gas inlet (100).

36. An apparatus for drying powdered or granular materials as set forth in claim 26, comprising, in place of the exhaust pipe (517), a branch pipe (519) connected at one end with a part between the blower (514) and the heater (513) and at the other end with the carrier gas inlet (100).

37. An apparatus for drying powdered or granular materials as set forth in claim 27, comprising, in place of the exhaust pipe (517), a branch pipe (519) connected at one end with a part between the blower (514) and the heater (513) and at the other end with the carrier gas inlet (100).

38. An apparatus for drying powdered or granular materials as set forth in claim 28, comprising, in place of the exhaust pipe (517), a branch pipe (519) connected at one end with a part between the blower (514) and the heater (513) and at the other end with the carrier gas inlet (100).

39. An apparatus for drying powdered or granular materials as set forth in claim 29, comprising, in place of the exhaust pipe (517), a branch pipe (519) connected at one end with a part between the blower (514) and the heater (513) and at the other end with the carrier gas inlet (100).

40. An apparatus for drying powdered or granular materials as set forth in claim 30, comprising, in place of the exhaust pipe (517), a branch pipe (519) connected at one end with a part between the blower (514) and the heater (513) and at the other end with the carrier gas inlet (100).

41. An apparatus for drying powdered or granular materials as set forth in claim 26, comprising, in place of the exhaust pipe (517), a pipe (520) having a compressor (521) at one end and connected at the other end with the carrier gas inlet (100).

42. An apparatus for drying powdered or granular materials as set forth in claim 27, comprising, in place of the exhaust pipe (517), a pipe (520) having a compressor (521) at one end and connected at the other end with the carrier gas inlet (100).

43. An apparatus for drying powdered or granular materials as set forth in claim 28, comprising, in place of the exhaust pipe (517), a pipe (520) having a compressor (521) at one end and connected at the other end with the carrier gas inlet (100).

44. An apparatus for drying powdered or granular materials as set forth in claim 29, comprising, in place of the exhaust pipe (517), a pipe (520) having a compressor (521) at one end and connected at the other end with the carrier gas inlet (100).

45. An apparatus for drying powdered or granular materials as set forth in claim 30, comprising, in place of the exhaust pipe (517), a pipe (520) having a compressor (521) at one end and connected at the other end with the carrier gas inlet (100).

46. An apparatus for drying powdered or granular materials as set forth in claim 1 or 2, comprising a drying tank (1) having a carrier gas inlet (100) and a carrier gas outlet (101), a circulation piping (531) connected at one end with the carrier gas outlet (101) and at the other end with a dehumidifying apparatus (532), another circulation piping (533) connected at one end with the dehumidifying apparatus (532) and at the other end with a heater (513), a hopper (512) connected with the heater (513) through a dehumidifying air introduction line (515), and an exhaust pipe (517) connected at one end with the hopper (512) and at the other end with the carrier gas inlet (100).

47. An apparatus for drying powdered or granular materials as set forth in claim 5 or 7, comprising a drying tank (1) having a carrier gas inlet (100) and a carrier gas outlet (101), a circulation piping (531) connected at one end with the carrier gas outlet (101) and at the other end with a dehumidifying apparatus (532), another circulation piping (533) connected at one end with the dehumidifying apparatus (532) and at the other end with a heater (513), a hopper (512) connected with the heater (513) through a dehumidifying air introduction line (515), and an exhaust pipe (517) connected at one end with the hopper (512) and at the other end with the carrier gas inlet (100).

48. An apparatus for drying powdered or granular materials as set forth in claim 11, comprising a drying tank (1) having a carrier gas inlet (100) and a carrier gas outlet (101), a circulation piping (531) connected at one end with a carrier gas outlet (101) and at the other end with a dehumidifying apparatus (532), another circulation piping (533) connected at one end with the dehumidifying apparatus (532) and at the other end with a heater (513), a hopper (512) connected with the heater (513) through a dehumidifying air introduction line (515), and an exhaust pipe (517) connected at one end with the hopper (512) and at the other end with the carrier gas inlet (100).

* * * * *